April 16, 1946.    D. HEENAN    2,398,375
LIQUID LEVEL INDICATOR
Filed July 5, 1943
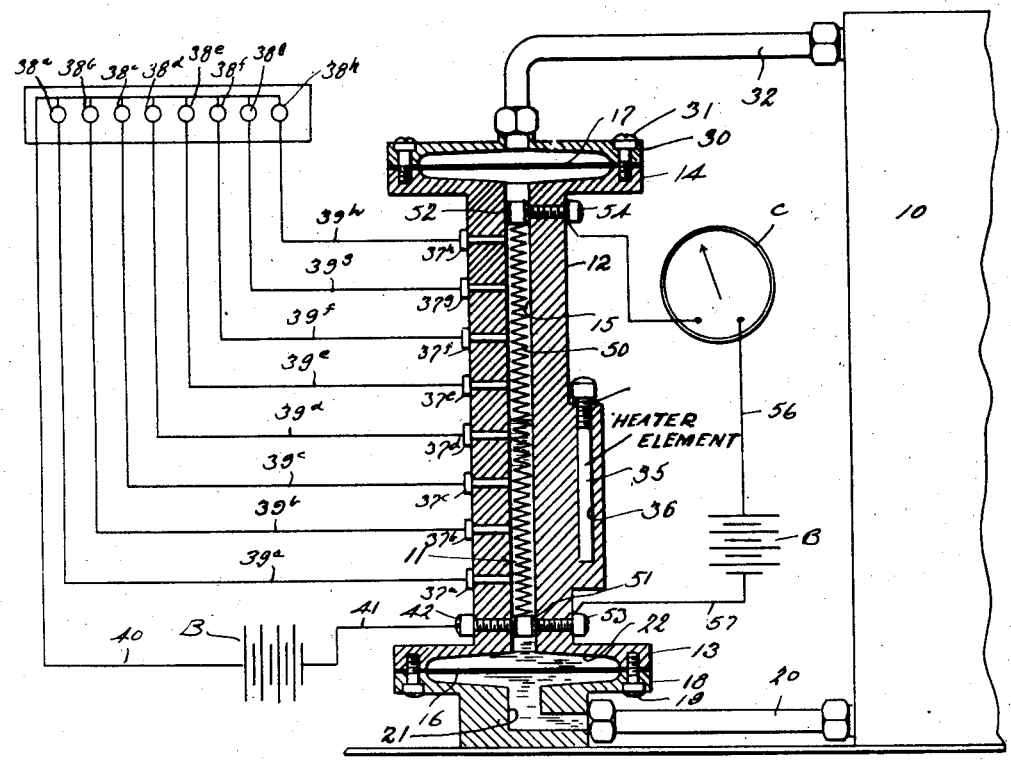
INVENTOR.
Daniel Heenan
BY
Attorney Patented Apr. 16, 1946

2,398,375

UNITED STATES PATENT OFFICE 2,398,375

LIQUID LEVEL INDICATOR

Daniel Heenan, Los Angeles, Calif., assignor to F. H. Breen, Los Angeles, Calif.

Application July 5, 1943, Serial No. 493,522

3 Claims. (Cl. 73—304)

This invention relates to a gauge for indicating the level of liquid in a tank, or the like, and it is an object of the invention to provide a simple, dependable and commercially practical device of this character.

There are many situations where it is desirable or necessary to determine the level of liquid in a tank or like vessel. For example, in aeroplanes it is highly important for the pilot to know the amount of fuel in the tank or tanks, as the case may be.

Devices have been provided for this general purpose but they have been characterized by floats or parts to be located within the tank, or they have involved levers or other mechanisms subject to failure and inaccuracy.

It is a primary object of this invention to provide a simple, practical, dependable level indicating device for a tank which is entirely free of floats, levers, or like elements subject to becoming stuck or to failure, or which complicate the tank construction, or which involve problems of installation, maintenance, etc.

Another object of the present invention is to provide a device for indicating the level of liquid in a tank at a point remote from the tank, without involving delicate parts and without parts within the tank itself.

A further object of this invention is to provide a device for indicating the level of liquid in a tank which in no way contaminates or interferes with the fluid in the tank and which is free of working joints or packings which might allow fluid to leak.

Another object of this invention is to provide a level indicating device of the character mentioned which in its preferred form includes a column at the exterior of the tank operated by the head of liquid in the tank, the column being mechanically separated from the liquid and acting to control an electrical signalling system, all in a manner entirely free of the hazard of sparking or other undesirable phenomena that might be dangerous in the presence of volatile fluids such as gasoline.

The various objects and features of my invention will be fully understood from the following detailed description of a typical preferred form and application of my invention, throughout which description reference is made to the accompanying drawing, in which the single figure of the drawing is a view illustrating one form of my invention applied to a tank, being a view showing the principal parts provided by the invention in vertical section and showing a form of the invention which involves two electrical signalling systems, either one or both of which may be used, as desired.

In the form of the invention shown in the figure of the drawing I have indicated a tank 10 which may for purpose of example be considered a fuel tank such, for example, as the fuel tank of an aeroplane, or the like. The invention provides, generally, a column 11 of suitable material carried in a body 12 at the exterior of the tank 10 to be operated by the head of liquid in the tank 10 and one or more electric signalling systems operated or controlled by the column 11.

In the preferred form of the invention the column 11 is formed by a body of mercury as such material possesses characteristics generally desirable in carrying out the invention. The body 12 which carries or confines the column 11 is an elongate tubular body of insulating material terminating at its lower end in a flange 13 and at its upper end in a flange 14. The opening 15 extending longitudinally through the body is preferably uniform in size throughout the length of the body and, in practice, may be small in diameter in order to minimize the quantity of mercury involved.

The column 11 of mercury is confined to the body 12 by a diaphragm 16 at the lower end of the body and a diaphragm 17 at the upper end of the body. The diaphragm 16 is a flexible diaphragm of suitable size and strength confined to the marginal portions of the flange 13 by a coupling flange 18. The flanges 13 and 18 may be secured together in any suitable manner, as by screws 19. The coupling flange serves as a fitting for connecting the parts just described with the tank 10. As shown in the drawing, a suitable fluid conduit or connection 20 serves to connect the flange fitting 18 with the lower portion of the tank 10, as clearly illustrated in the drawing. A fluid passage 21 provided in the flange fitting 18 conducts fluid from the connection 20 to the under side of the diaphragm 16.

The flange 13 may be considerably larger in diameter than the body on which it is formed and, in accordance with the preferred construction, it is recessed with the preferred construction, it is recessed at 22 to form a reservoir to carry a substantial volume or body of mercury as a base for the colume 11.

With the arrangement just described liquid carried in the tank 10 is communicated to the under side of the diaphragm 16 so that the head pressure of the liquid in the tank 10 is applied to the diaphragm urging it upwardly against the head of the column of mercury. It will be apparent that the height to which the column is forced in the body 12 will depend upon the head of liquid in the tank 10 and it will be apparent how the parts can be proportioned so that the proper relationship between the level of liquid in the tank and the height of the column 11 is obtained.

The diaphragm 17 closes the upper end of the body 12 and in the construction illustrated it is confined to the marginal portions of the flange 14 by a flange fitting 30 secured to the flange 14 by screws 31. A pressure connection 32 connects the upper portion of the tank 10 with the flange fitting 30 so that the pressure on the upper side of the diaphragm 17 is the same as that in the tank 10 above the liquid therein. Through this construction the column 11 in the body 12 is entirely confined to be subjected only to the pressures prevailing in the tank 10 and is not in any way influenced by outside pressures such as might otherwise interfere with the accuracy of the device.

In accordance with the preferred form of my invention I provide a heating element 35, preferably an electrically energized heating element, in connection with the body 12 as a means for maintaining the device at a suitable temperature. For normal use a heating device 35 is not necessary but should the instrument be used in localities or under conditions where it is subjected to extremely low temperatures the heater is desirable. It will be understood that the heater 35 may be any suitable type of electrical heating device and may be suitably carried in a socket or compartment 36 formed in the body 12.

In the form of the invention shown in the figure I provide two independently operating electric means for indicating the height of the column 11 in the body 12, which, of course, indicates the height of the liquid in the tank 10. The form of signalling system shown at the left of the body includes a plurality of contacts 37ᵃ, 37ᵇ, 37ᶜ, 37ᵈ, 37ᵉ, 37ᶠ, 37ᵍ and 37ʰ spaced apart longitudinally of the body so that their inner ends are exposed to the column 11 of mercury within the body while their outer ends are exposed as terminals. A plurality of signal lights 38ᵃ, 38ᵇ, 38ᶜ, 38ᵈ, 38ᵉ, 38ᶠ, 38ᵍ and 38ʰ are arranged at a point remote from the tank or wherever it is desired to read the level of liquid in the tank. Contact 37ᵃ is connected with light 38ᵃ by an electrical connection 39ᵃ, contact 37ᵇ is connected with light 38ᵇ by an electrical connection 39ᵇ, contact 37ᶜ is connected with light 38ᶜ by an electrical connection 39ᶜ, contact 37ᵈ is connected with light 38ᵈ by an electrical connection 39ᵈ, contact 37ᵉ is connected with light 38ᵉ by an electrical connection 39ᵉ, contact 37ᶠ is connected with light 38ᶠ by an electrical connection 39ᶠ, contact 37ᵍ is connected with light 38ᵍ by an electrical connection 39ᵍ, and contact 37ʰ is connected with light 38ʰ by an electrical connection 39ʰ. The electrical system is energized from a suitable source such as a battery B, one side of the battery being connected by a line 40 to one terminal of each of the signal lights, while the other side of the battery is connected by line 41 with a contact 42 carried by the body 12 to have contact with the lower end portion of the mercury column 11.

With the circuit described the mercury column 11 serves to connect the contacts 42 with the spaced contacts 37ᵃ, 37ᵇ, 37ᶜ, 37ᵈ, 37ᵉ, 37ᶠ, 37ᵍ and 37ʰ successively as the column rises in the body.

Whenever one of the spaced contacts is engaged by the mercury column the circuit through that contact is closed so that the corresponding signal light is energized.

The signalling system shown at the right in the figure involves a resistance element 50 arranged longitudinally in the opening 15 of the body 12 between spaced collars 51 and 52 located at the lower and upper end portions of the body, respectively. A contact member 53 engages the lower collar 51 while a contact member 54 engages the upper collar 52. The circuit is energized by a battery B, or the like, and a suitable instrument such as an ammeter C is provided in a line 56 which connects one side of the battery B with the contact 54. The other side of the battery is connected to the contact 53 by a line 57.

With the signalling system just described there is normally a closed circuit through the instrument C which may be located at any desirable point remote from the other parts. As the mercury column 11 varies in height in the body 12 due to variation in head of liquid in the tank 10, the resistance of the circuit varies and is indicated by the instrument C.

Having described only a typical preferred form and application of my invention, I do not wish to be limited or restricted to the specific details herein set forth, but wish to reserve to myself any variations or modifications that may appear to those skilled in the art or fall within the scope of the following claims.

Having described my invention, I claim:

1. A liquid level indicator for use in connection with a liquid carrying tank including, a vertically arranged tubular body, diaphragms closing the ends of the body, a column of mercury confined in the body to operate in the body in response to fluid pressure applied to the lower diaphragm, electrical means for indicating the height of the column in the body, and a fluid connection for supplying fluid pressure from the bottom of the tank to the under side of the lower diaphragm to operate the column.

2. A liquid level indicator for use in connection with a liquid carrying tank including, a vertically arranged tubular body, means for heating the body, diaphragms closing the ends of the body, a column of mercury confined in the body between the diaphragms to operate therein responsive to fluid pressure applied to the under side of the lower diaphragm, electrical means for indicating the height of the column in the body including spaced contacts carried by the body to be engaged by the column of mercury, and a fluid connection for supplying fluid pressure from the tank to the under side of the lower diaphragm to operate the column.

3. A liquid level indicator for use in connection with a liquid carrying tank including, a vertically arranged tubular body, diaphragms closing the ends of the body, a column of mercury confined in the body between the diaphragms to operate vertically therein responsive to fluid pressure applied to the lower diaphragm, electrical means for indicating the height of the column in the body, a pressure connection for equalizing pressure between the tank above the liquid and the body above the diaphragm at its upper end, and a fluid connection for supplying fluid pressure from the tank to the under side of the lower diaphragm to operate the column.

DANIEL HEENAN.